Feb. 10, 1970 R. Z. GERLACK 3,495,192

ECCENTRIC INDUCTIVE TUNED COUPLED CAVITY FILTERS

Filed Nov. 4, 1966

INVENTOR.
RICHARD Z. GERLACK

BY John C Randa

United States Patent Office 3,495,192
Patented Feb. 10, 1970

3,495,192

ECCENTRIC INDUCTIVE TUNED COUPLED CAVITY FILTERS

Richard Z. Gerlack, Cupertino, Calif., assignor to Varian Associates, Palo Alto, Calif., a corporation of California Filed Nov. 4, 1966, Ser. No. 591,999
Int. Cl. H03h *7/10*
U.S. Cl. 333—73 1 Claim This invention relates in general to the field of microwave filters and more particularly to coupled cavity microwave filters having eccentric inductive tuning means.

A need exists in many modern day radar systems for compact high power microwave filters that are easy to design and cheap to build. A number of possible designs such as the interdigital, ladder, cylindrical tanks, and the like filter approaches may be used to meet specific design requirements. The coupled cavity plural cell filter approach is especially advantageous for handling high powers at microwave frequencies. This type of filter can be designed to have good low pass and/or band pass characteristics and handle 100's of kilowatts of power in certain waveguide sizes. The design techniques for obtaining desired response characteristics are well known and will not be repeated herein. See for example, G. C. Southworth, Principles and Applications of Waveguide Transmission, New York, D. Van Nostrand Co., Inc. 1950, pages 285–293; S. B. Cohn, "Direct Coupled Resonator Filters," Proc. of the IRE, vol. 45 (February 1957), pages 187–196; and a good survey article by E. S. Hensperger entitled "A Simplified Approach to the Design of Band Pass Filters in Waveguide," The Microwave Journal, November 1959, pages 39–44.

The present invention is concerned with providing a simplified inductive tuning mechanism which enables the designer to optimize the filter band response characteristics while minimizing the fabrication problems and doing so without reduction in the coupled cavity power handling capabilities. The inductive tuning mechanism is also advantageously applicable to continuously tunable as well as fixed tuned filters. A specific embodiment of the present invention involves the incorporation of one or more inductive tuning members in the individual cells or cavities of the filter in the form of eccentrically mounted rotatable inductive tuning posts. The eccentric mounting (the post is located off axis with respect to the axis of rotation) permits the inductive tuning posts to be moved into and out of the respective cavities with a simple rotary movement either on a permanent or continuously tunable basis.

It is therefore an object of the present invention to provide novel inductive tuning mechanisms for plural cavity microwave filters.

A feature of the present invention is the provision of a plural cavity microwave filter having one or more cavities provided with one or more eccentric inductive tuning posts.

These and other features and advantages of the present invention will become more apparent upon a perusal of the following specification taken in conjunction with the accompanying drawings wherein.

Figures 1, 2, 5, 6:
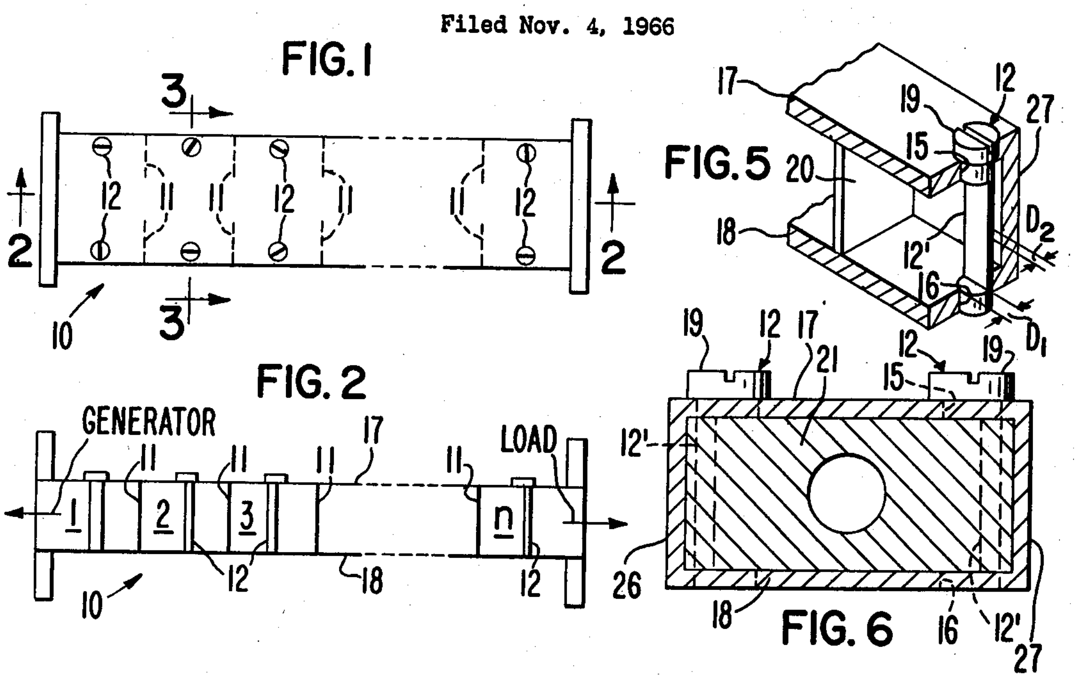
FIG. 1 is a fragmented planar view of a plural cavity microwave filter incorporating inductive tuning means.
FIG. 2 is a side view of the filter depicted in FIG. 1 taken along the lines 2—2 in the direction of the arrows.
FIG. 5 is an enlarged perspective view of the eccentric inductive tuning post portion of the filter depicted in FIG. 1.
FIGS. 6–8 are various inductive susceptances which can advantageously be used to define the individual cavity cells of a plural cavity filter.
Figure 3:
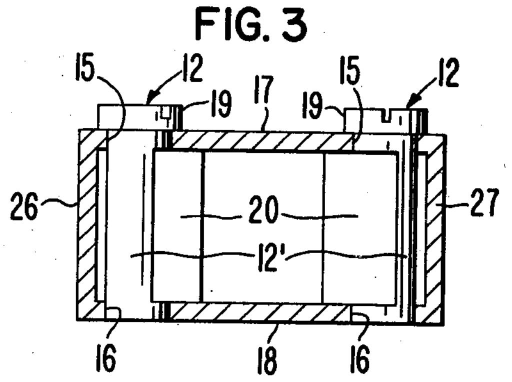
FIG. 3 is a sectional view of the filter depicted in FIG. 1 taken along the lines 3—3 in the direction of the arrows.
Figure 4:
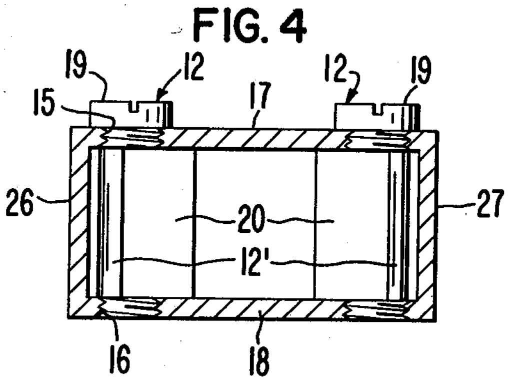
FIG. 4 is a modified version of the eccentric tuner depicted in FIG. 3.

Turning now to FIGS. 1 and 2 there is depicted a plural cavity high power microwave filter 10 made of copper or the like waveguide and divided into a plurality of cavity cells, 1, 2, 3 . . . *n* by means of inductive susceptances indicated by dotted lines 11. One or more, or all of the cavities are provided with inductive tuning means 12 which as best seen in FIGS. 3–5 includes an eccentric post 12' of suitable conductive material such as copper, brass, etc. mounted so as to be parallel with the narrow guide walls and thus oriented in a manner to increase or decrease the cavity electrical length upon rotation. The increase or decrease in cavity length or increase or decrease in inductance upon rotation of the inductive posts will result in tuning of the individual cavities via an inductive tuning process by perturbation of the magnetic H fields in the cavities.

The simplicity of the design permits the individual tuning means 12 to be made of an integral machined part if desired and simply dropped into a pair of aligned bores 15, 16 on the top and bottom broadwalls 17, 18 of the rectangular guide 10 as shown best in FIGS. 3 and 5. The tuning posts 12' are supported via enlarged nut portion 19. If desired the portions of tuning means 12 which are disposed in bores 15, 16 may be threaded and the bores threaded also as shown in FIG. 4 to permit ease of adjustment with any convenient tool, e.g., screwdriver which, of course, may also be used to rotate the non-threaded version also. The interfit can be as snug as desired.

Rotation of the tuning post as depicted in FIG. 5 in either a clockwise or counterclockwise direction so as the post is moved in towards the center of the cavity will result in an increase in the resonant frequency of the cavity. This is the result of field perturbations, the physical limit of which is when a post would be moved completely to the center of the original cavity and effectively forming two cavities the resonant frequencies of which would then be twice the original cavities resonant frequency. Its use as a filter at this times 2 frequency would of course not work because of the exact inductances required in filter designs and the over-moding occurring at this high frequency in the over-sized waveguide. This method of tuning can, however, be compared as an exact opposite to filters using capacitive screws inserted into cavities to increase the lengths of cavities and therefore decrease the resonant frequency of the cavities. In our case an inductive post is added to the cavity to effectively reduce the length of the cavity thereby increasing the resonant frequency of the cavity. Thus for fixed tuned cavities the design tolerances are simplified by simply making each cavity slightly oversized at the design frequency (lower than the desired cavity resonant frequency) which is predetermined according to design techniques well known in the art as discussed previously, and then tuning them to the higher frequency. The problem is not the theoretical dimension of the cavities but the fabrication costs involved in attaining specified design goals. The use of oversized cavities have demonstrated tolerances of e.g. $\pm 5\%$ and are still able to be tuned to an exact center frequency by simple rotation of tuning post 12'. Considerable savings in fabrication cost can be realized by the necessity of otherwise having to attain tolerances about $\pm .2\%$. A good tuning range can be obtained by maintaining a primary axis diameter $D_1$ to tuning post diameter or thickness $D_2$ of 2 to 1. The tuning post eccentric portion 12' is e.g. circular, or semi-circular as shown.

Each tuning post is centered in the individual cells or cavities as shown for maximum tuning range. Since the posts are oriented in the direction of E-fields in the rectangular guide no power reduction problems exist as would be the case if capacitance tuning means were employed.

Figure 8:
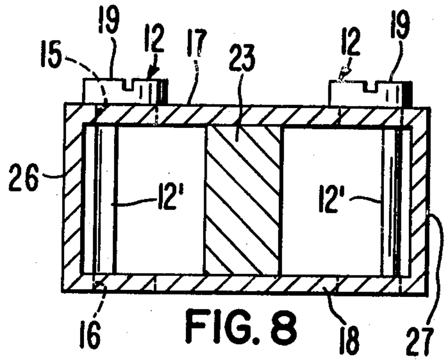

A 9 cavity X-band band pass filter using the centered posts of FIG. 8 was built and handled 10 kw. C.W. power levels with a design passband of 6%. L band filters with 12 cavities have been constructed with this tuning technique and have handled powers in excess of 5 mw. peak power.

The cells 1, 2, 3 . . . *n* can be defined by inductive susceptance means such as of the symmetrical vane 20 type as depicted in FIGS. 3, 4, 5 or the apertured solid sheet type 21 as shown in FIG. 6.

Figure 7:
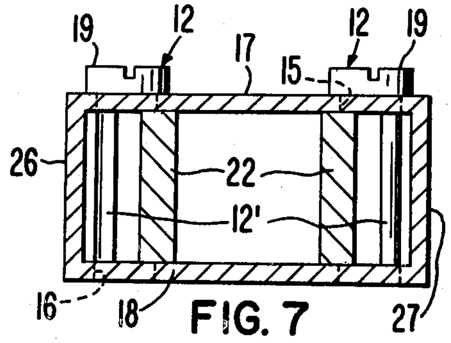

Other well known types of cell defining inductive susceptances are the symmetrical posts 22 and centered post 23 types depicted in FIGS. 7 and 8 respectively.

The eccentric tuning posts are advantageously designed to lie as close to the narrow side walls 26, 27 of rectangular guide 10 as feasible to obtain maximum mechanical adjustment for minimum electrical change. This results in very fine tuning within a specified band.

After the desired filter response is achieved by individual adjustments of the cavity inductances the posts may be brazed or otherwise secured in place for a fixed tuned filter application. If continuously variable tuning is desired, the individual tuning posts may be ganged together by any conventional means.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a plural coupled cavity microwave filter, means forming a rectangular waveguide having a pair of broad walls and a pair of narrow side walls and being subdivided into a plurality of axially aligned coupled cavity regions, tuner means for tuning the filter and including at least one inductive tuning member in one of said coupled cavity regions for controlling the response characteristics of the filter, the improvement wherein, said inductive tuning member comprises a conductive post rotatably mounted within said waveguide and extending from one broad wall to the opposed broad wall of said waveguide parallel to said narrow walls of said waveguide, said posts being conductively connected at opposite ends to said broad walls, said post being located in the predominantly inductive region of said waveguide nearer to said narrow side walls than to the center axis of said waveguide, said post being formed to define an eccentric conductive structure relative to the axis of rotation of said post such that upon rotation of said post the remaining conductive portion of the post varies its spacing from the adjacent narrow side walls of said waveguide while remaining parallel thereto for tuning the filter inductively.

References Cited

UNITED STATES PATENTS 2,442,671 6/1948 Tompkins ---------- 333—83
2,749,523 6/1956 Dishal.

HERMAN K. SAALBACH, Primary Examiner

T. J. VEZEAU, Assistant Examiner

U.S. Cl. X.R.

333—98